(No Model.)

F. W. SMITH.
PENDENT HANDLE.

No. 455,769. Patented July 14, 1891.

WITNESSES:
S. S. Williamson.
J. S. Finch.

INVENTOR
Friend W. Smith

BY
F. W. Smith Jr.
ATTORNEY

UNITED STATES PATENT OFFICE.

FRIEND W. SMITH, OF BRIDGEPORT, CONNECTICUT.

PENDENT HANDLE.

SPECIFICATION forming part of Letters Patent No. 455,769, dated July 14, 1891.

Application filed January 6, 1891. Serial No. 376,874. (No model.)

*To all whom it may concern:*

Be it known that I, FRIEND W. SMITH, a citizen of the United States, residing at Bridgeport, in the county of Fairfield and State of Connecticut, have invented certain new and useful Improvements in Pendent Handles for Drawer-Pulls; and I do hereby declare the following to be a full, clear, and exact description of the invention, such as will enable others skilled in the art to which it appertains to make and use the same.

My invention relates to certain new and useful improvements in the manufacture of pendent handles which have projecting therefrom an eye or the like for attachment to a drawer, and has for its object to provide a very cheap and durable drawer-pull which cannot mar the wood-work of the drawer.

Figure 1:
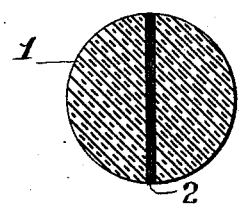
Figure 2:
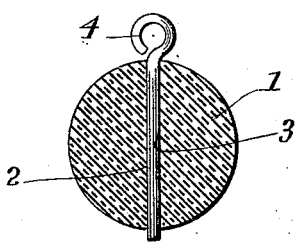
Figure 3:
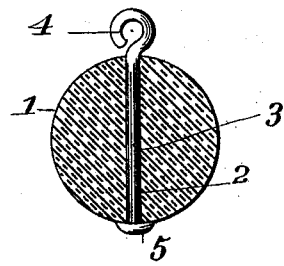

In the accompanying drawings, Figure 1 is a sectional elevation of the rubber body; Fig. 2, a sectional elevation showing the spindle assembled within the body preparatory to shouldering; Fig. 3, a sectional elevation of the completed handle, and Fig. 4 a sectional elevation showing the handle with a shoulder formed at the eye end of the spindle.

Similar numerals denote like parts in the several figures.

1 is the rubber body, preferably of spherical shape, and having a perforation 2 therethrough.

3 is the spindle whose diameter is preferably greater than that of the perforation 2.

4 is an eye formed at one end of the spindle to afford an attachment of the ordinary shank that is secured within the drawer.

The spindle is inserted through the perforation 2, as shown at Fig. 2, and is headed, as shown at 5, to confine the body 1.

Figure 4:
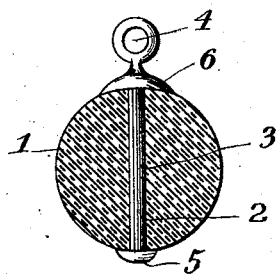

If desired, an ornamental shoulder 6 may be formed on the eye end of the spindle, as shown at Fig. 4.

I do not wish to be understood as claiming any construction wherein the spindle is threaded to receive a nut, since the spindle which I use is perfectly plain.

Having thus described my invention, what I claim as new, and desire to secure by Letters Patent, is—

A pendent handle comprising a spherical rubber body having a perforation therethrough and a single spindle extending clear through said perforation and projecting at the ends thereof, one end of said spindle having an eye for attachment to any suitable object, while the other end is shouldered to retain the rubber body, substantially as set forth.

In testimony whereof I affix my signature in presence of two witnesses.

FRIEND W. SMITH.

Witnesses:
F. W. SMITH, Jr.,
S. S. WILLIAMSON.